United States Patent [19]
Cheng

[11] Patent Number: 5,443,159
[45] Date of Patent: Aug. 22, 1995

[54] TRI-CASSETTE CARRIER

[76] Inventor: Yu-Feng Cheng, No. 7, Fu Hsing St., Tu Cheng Ind. Dist., Taipei Hsien, Taiwan

[21] Appl. No.: 337,201

[22] Filed: Nov. 7, 1994

[51] Int. Cl.[6] .............................................. B65D 85/672
[52] U.S. Cl. ................................ 206/387.1; 206/473; 206/387.13
[58] Field of Search ............ 206/387.1, 387.13, 387.14, 206/472, 473, 1.5; 220/324

[56] References Cited

U.S. PATENT DOCUMENTS

| 4,951,814 | 8/1990 | Belmont | 206/387.13 X |
| 5,341,926 | 8/1994 | Leben | 206/387.1 X |
| 5,383,557 | 1/1995 | Weisburn et al. | 206/387.13 |

Primary Examiner—Jacob K. Ackun
Attorney, Agent, or Firm—Sixbey, Friedman, Leedom & Ferguson

[57] ABSTRACT

A tri-cassette carrier includes a first panel, two protrusions projecting from the first panel and each including a head formed at a free end portion, two hooks projecting from a free edge of the first panel and each including a barb formed on a free end potion, a second panel hinged to the first panel, two clips formed on the second panel, a third panel hinged to the second panel, two protrusions projecting from the third panel and each including a head formed at a free end portion, a strip projecting from a free edge of the third panel, and two barbs formed on the strip. The barbs formed on the hooks are engageable with the barbs formed on the strip for retaining the carrier in a closed position. The strip defines two recesses each forming a thin portion on which a corresponding one of the barbs is formed. Thickness of each of the thin portions of the strip plus the thickness of each of the hooks is equal to thickness of the strip so that the hooks lie flush with the strip when the barbs formed on the hooks are engaged with the barbs formed on the strip, resulting in a minimum profile of the carrier when the carrier is closed.

3 Claims, 2 Drawing Sheets

TRI-CASSETTE CARRIER

BACKGROUND OF THE INVENTION

This invention relates to a tri-cassette carrier.

Tape cassettes are generally contained in cases for protective purposes. Each of the cases includes a first shell and a second shell. The first shell includes a container including two lateral portions each defining a hole and a panel projecting from the container. The second shell includes a panel, a strip projecting from the panel and two connecting strips projecting from the panel. Two protrusions project from the panel of the second shell. A boss is formed on each of the connecting strips near a tip. Each of the bosses is receivable in a corresponding one of the holes so that the first shell is pivotably connected with the second shell. A tape cassette is partly received in the container of the first shell. The protrusions are insertable into two apertures defined in the tape cassette when the case is closed. The cases are bulky, therefore, it is inconvenient for users to carry them.

To solve the above-mentioned problem, there is a uni-cassette carrier. The uni-cassette carrier is a plastic plate defining two parallel grooves thus forming a first panel, a second panel and a third panel. A recess is defined in the first panel. Two solid protrusions project from the first panel. A recess is defined in the third panel. Two hollow protrusions project from the third panel. A tape cassette is disposed between the first and third panels. A protrusion formed on a side of the tape cassette is receivable in the recess defined in the first panel while a protrusion formed on an opposed side of the tape cassette is receivable in the recess defined in the third panel. The hollow protrusions are insertable through two apertures defined in the tape cassette. Each of the solid protrusions is insertable into the hollow protrusions for firmly retaining the uni-cassette carrier in a closed position. Such a uni-cassette carrier cannot be used for carrying two or more tape cassettes.

SUMMARY OF THE INVENTION

It is the primary objective of this invention to provide a tri-cassette carrier.

The tri-cassette carrier includes a first panel, two protrusions projecting from the first panel and each including a head formed at a free end portion, two hooks projecting perpendicularly from a free edge of the first panel and each including a barb formed on a free end potion, a second panel hinged to the first panel, two clips formed on the second panel, a third panel hinged to the second panel, two protrusions projecting from the third panel and each including a head formed at a free end portion, a strip projecting perpendicularly from a free edge of the third panel, and two barbs formed on the strip. The barbs formed on the hooks are engageable with the barbs formed on the strip for firmly retaining the carrier in a closed position. The strip defines two recesses each forming a thin portion on which a corresponding one of the barbs is formed.

Thickness of each of the thin portions of the strip plus the thickness of each of the hooks is equal to thickness of the strip so that the hooks lie flush with the strip when the barbs formed on the hooks are engaged with the barbs formed on the strip, resulting in a minimum profile of the carrier when the carrier is closed.

DETAILED DESCRIPTION OF THE PREFERRED EMBODIMENT

Figure 1:
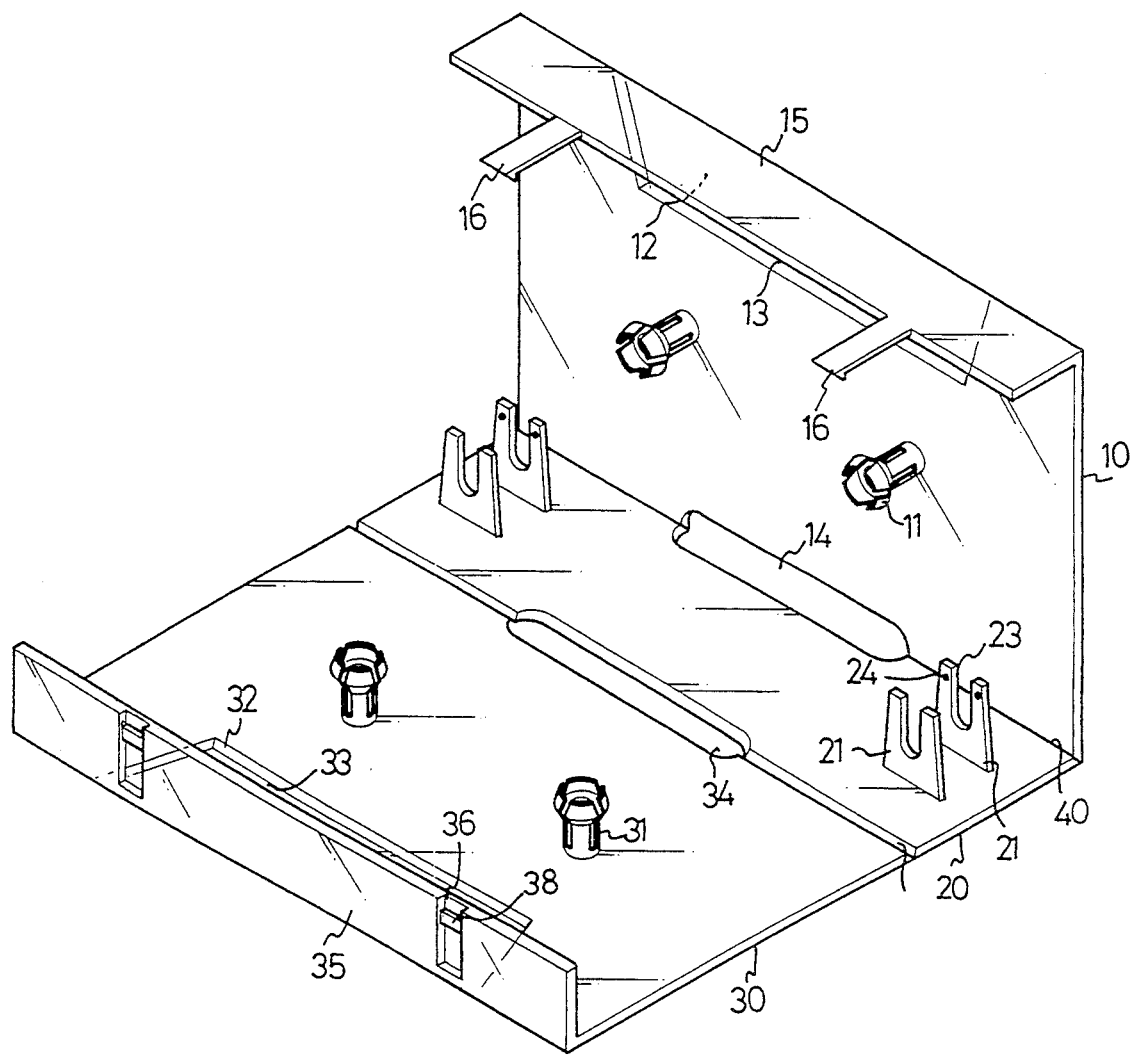
FIG. 1 is an isometric view of the preferred embodiment of a tri-cassette carrier in an open position according to this invention.

Referring to FIG. 1, a tri-cassette carrier includes a plastic plate. Two parallel grooves 40 and 41 are defined in the plastic plate thus dividing the plastic plate into a first panel 10, a second panel 20 and a third panel 30. A slot 14 is defined in the plastic plate between the first panel 10 and the second panel 20. The length of the slot 14 is less than the length of the groove 40. A slot 34 is defined in the plastic plate between the second panel 20 and the third panel 30. The length of the slot 34 is smaller than the length of the groove 41.

The first panel 10 defines a recess 12 for receiving a protrusion formed on a tape cassette. Two protrusions 11 project from the first panel 10. Each of the protrusions 11 includes a body and a head larger than the body in size. A number of slits are defined in each of the protrusions 11 so that the heads of the protrusions 11 are compressible easily. A strip 15 projects from the first panel 10 at an edge. Two hooks 16 project from an edge of the strip 15. Each of the hooks 16 includes a body and a barb formed on a free end portion of the body. The protrusions 11 and the hooks 16 project towards the third panel 30 when the carrier is closed.

Two clips project from the second panel 20. Each of the clips includes two parallel forks 21. Each of the forks 21 includes two separated elastic prongs 23. A boss 24 projects from each of the prongs of each of the forks 21.

The third panel 30 defines a recess 32 for receiving a protrusion formed on a tape cassette. Two protrusions 31 project from the third panel 30. Each of the protrusions 31 includes a body and a head larger than the body in size. A number of slits are defined in each of the protrusions 31 so that the heads of the protrusions 31 are compressible easily. A strip 35 projects from the third panel 30 at an edge. The strip 35 defines two recesses 36 resulting in two thin portions on the strip 35 within the recesses 36. Each of two barbs 38 is formed on a corresponding one of the thin portions of the strip 35. The protrusions 31 project towards the first panel 30 when the carrier is closed.

Figure 3:
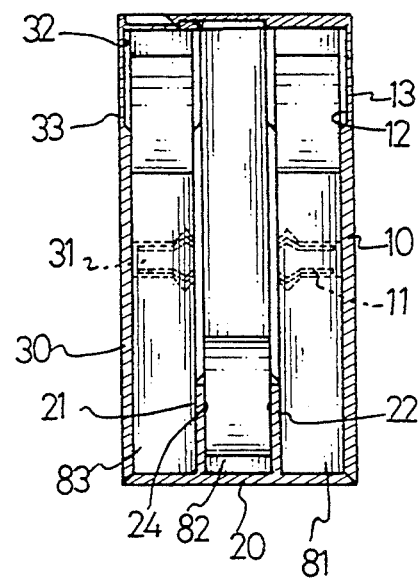
FIG. 3 is a cross-sectional view of the tri-cassette carrier as shown in FIG. 2.
Figure 2:
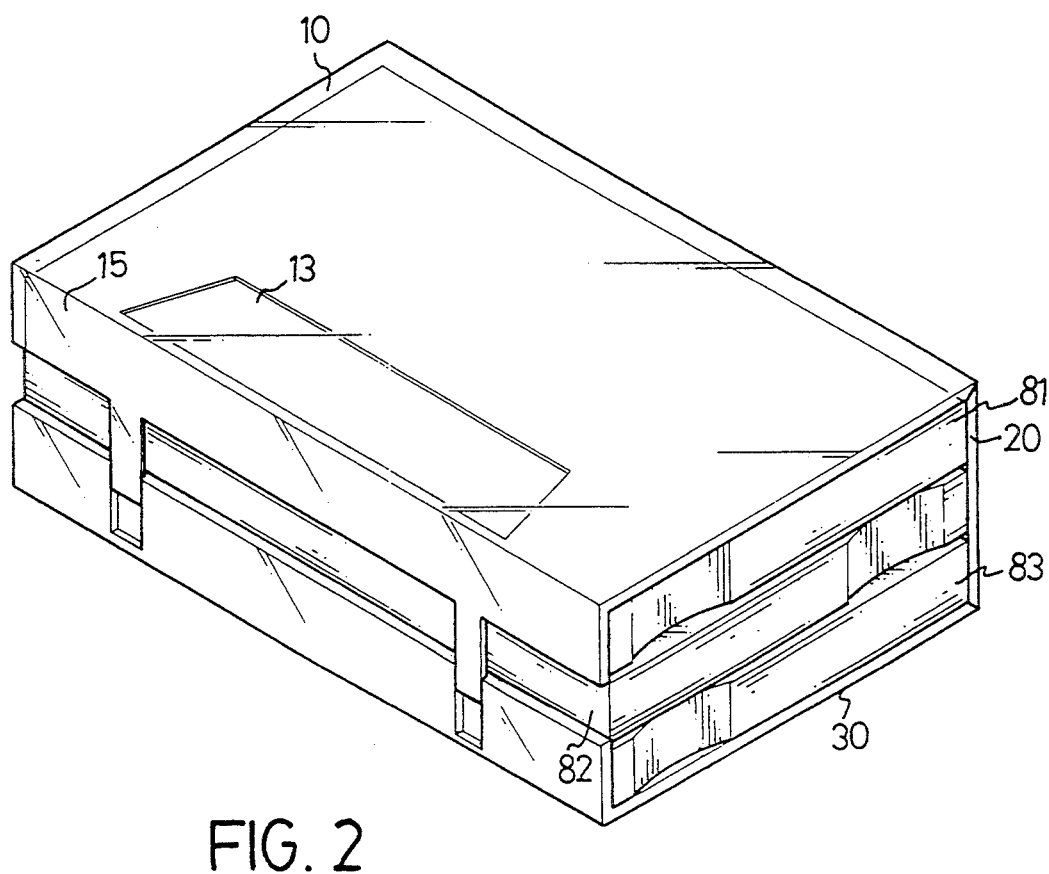
FIG. 2 is an isometric view of the tri-cassette carrier as shown in FIG. 1 but showing the tri-cassette carrier in a closed position.

Referring to FIGS. 2 and 3, three tape cassettes 81, 82 and 83 are contained by means of the carrier. Each of the tape cassettes 81, 82 and 83 includes a first protrusion formed on a surface and a second protrusion formed on an opposed surface. The tape cassette 81 is located between the first panel 10 and the clips. The first protrusion of the tape cassette 81 is receivable in the recess 32. When the carrier is closed, the protrusions 11 are insertable through two holes defined in the tape cassette 81 for retaining the tape cassette 81 on the first panel 10. The tape cassette 83 is located between the clips and the third panel 30. The second protrusion formed on the tape cassette 83 is receivable in the recess 32. When the carrier is closed, the protrusions 31 are insertable through two holes defined in the tape cassette 83 for retaining the tape cassette 83 on the third panel 30. The tape cassette 82 is located in an opposed orientation between the tape cassettes 81 and 83. Each of two portions of the tape cassette 82 is clamped by means of a corresponding one of the clips. The first and second protrusions of the tape cassette 82 are located between the clips. The first and second protrusions of the tape cassette 82 are further restrained by means of the second protrusion of the tape cassette 81 and the first protrusion of the tape cassette 83. The barbs of the hooks 16 are engageable with the barbs 38 for firmly retaining the carrier in the closed position. The thickness of each of the hooks 16 plus the thickness of each of the thin portions of the strip 35 is equal to the thickness of the strip 35. The hooks 16 lie flush with the strip 35 when the barbs formed on the hooks 16 are engaged with the barbs formed on the strip 35, resulting in a minimum profile of the carrier when the carrier is closed.

I claim:

1. A tri-cassette carrier comprising a first panel, two protrusions projecting from the first panel and each including a head formed at a free end portion, two hooks projecting from a free edge of the first panel and each including a barb formed on a free end portion, a second panel hinged to the first panel, two clips formed on the second panel, a third panel hinged to the second panel, two protrusions projecting from the third panel and each including a head formed at a free end portion, a strip projecting from a free edge of the third panel, and two barbs formed on the strip, wherein the barbs formed on the hooks are engageable with the barbs formed on the strip for retaining the carrier in a closed position.

2. A tri-cassette carrier according to claim 1 wherein the strip defines two recesses each forming a thin portion on which a corresponding one of the barbs is formed, wherein thickness of each of the thin portions of the strip plus thickness of each of the hooks is equal to the thickness of the strip so that the hooks lie flush with the strip when the barbs formed on the hooks are engaged with the barbs formed on the strip, resulting in a minimum profile of the carrier when the carrier is closed.

3. A tri-cassette carrier according to claim 1 wherein the first, second and third panels are different portions of a single plastic plate.

* * * * *